(12) United States Patent
Bai et al.

(10) Patent No.: US 11,086,178 B1
(45) Date of Patent: Aug. 10, 2021

(54) ARRAY SUBSTRATE, DISPLAY PANEL, DISPLAY APPARATUS, AND METHOD OF FABRICATING ARRAY SUBSTRATE

(71) Applicants: BEIJING BOE OPTOELECTRONICS TECHNOLOGY CO., LTD., Beijing (CN); BOE Technology Group Co., Ltd., Beijing (CN)

(72) Inventors: Lu Bai, Beijing (CN); Yanna Xue, Beijing (CN); Zhiying Bao, Beijing (CN); Yong Zhang, Beijing (CN)

(73) Assignees: BEIJING BOE OPTOELECTRONICS TECHNOLOGY CO., LTD., Beijing (CN); BOE Technology Group Co., Ltd., Beijing (CN)

(*) Notice: Subject to any disclaimer, the term of this patent is extended or adjusted under 35 U.S.C. 154(b) by 65 days.

(21) Appl. No.: 16/631,448

(22) PCT Filed: Apr. 15, 2019

(86) PCT No.: PCT/CN2019/082686
§ 371 (c)(1),
(2) Date: Jan. 15, 2020

(87) PCT Pub. No.: WO2020/103387
PCT Pub. Date: May 28, 2020

(30) Foreign Application Priority Data

Nov. 22, 2018 (CN) .......................... 201811396701.6

(51) Int. Cl.
*G02F 1/1343* (2006.01)
*G02F 1/1333* (2006.01)
(Continued)

(52) U.S. Cl.
CPC ...... *G02F 1/136213* (2013.01); *G02F 1/1368* (2013.01); *G02F 1/13338* (2013.01);
(Continued)

(58) Field of Classification Search
CPC ......... G02F 1/136227; G02F 1/133553; G02F 1/134363; G02F 1/1368; G02F 1/133345;
(Continued)

(56) References Cited

U.S. PATENT DOCUMENTS

| | | | |
|---|---|---|---|
| 2006/0055852 A1 | 3/2006 | Yoshida et al. | |
| 2011/0085121 A1 | 4/2011 | Jeon et al. | |

(Continued)

FOREIGN PATENT DOCUMENTS

| | | | |
|---|---|---|---|
| CN | 102033365 A | 4/2011 | |
| CN | 103474437 A | 12/2013 | |

(Continued)

OTHER PUBLICATIONS

International Search Report & Written Opinion dated Aug. 21, 2019, regarding PCT/CN2019/082686.

(Continued)

*Primary Examiner* — Thoi V Duong
(74) *Attorney, Agent, or Firm* — Intellectual Valley Law, P.C.

(57) ABSTRACT

An array substrate in a respective one of the plurality of subpixels includes a base substrate; a reflective electrode configured to reflect incident ambient light for image display in a reflective display mode; a first insulating layer on a side of the reflective electrode away from the base substrate; a pixel electrode configured to receive a data voltage for driving liquid crystal molecules and on a side of the first insulating layer away from the reflective electrode; a second insulating layer on a side of the pixel electrode away from the first insulating layer; and a common electrode configured (Continued)

to receive a common voltage and on a side of the second insulating layer away from the pixel electrode. The common electrode, the second insulating layer; and the pixel electrode constitute a first capacitor. The pixel electrode, the first insulating layer, and the reflective electrode constitute a second capacitor.

20 Claims, 6 Drawing Sheets

(51) Int. Cl.
    *G02F 1/1368* (2006.01)
    *G02F 1/1362* (2006.01)
    *G02F 1/1335* (2006.01)

(52) U.S. Cl.
    CPC .... *G02F 1/13439* (2013.01); *G02F 1/133345* (2013.01); *G02F 1/133553* (2013.01); *G02F 1/134309* (2013.01); *G02F 1/134345* (2021.01); *G02F 1/136295* (2021.01); *G02F 1/134318* (2021.01); *G02F 1/134363* (2013.01); *G02F 1/136227* (2013.01)

(58) Field of Classification Search
    CPC ......... G02F 1/136286; G02F 1/134309; G02F 1/13439; G02F 1/136213; G02F 1/136295; G02F 1/133707; G02F 1/1362; G02F 1/13338; G02F 1/1343; G02F 1/134318; G02F 1/134345; G02F 1/1333; G02F 1/1335; G02F 2201/121; G02F 2201/123; G02F 2203/02

See application file for complete search history.

(56) References Cited

U.S. PATENT DOCUMENTS

| | | |
|---|---|---|
| 2016/0064421 A1 | 3/2016 | Oh et al. |
| 2016/0197096 A1 | 7/2016 | Sun et al. |
| 2017/0082881 A1 | 3/2017 | Wang et al. |
| 2017/0205953 A1 | 7/2017 | Sun et al. |
| 2017/0285386 A1* | 10/2017 | Ono ..................... G09G 3/3648 |
| 2018/0233518 A1 | 8/2018 | Qing et al. |

FOREIGN PATENT DOCUMENTS

| | | |
|---|---|---|
| CN | 104280951 A | 1/2015 |
| CN | 105204252 A | 12/2015 |
| CN | 105390504 A | 3/2016 |
| CN | 105629597 A | 6/2016 |
| CN | 106647055 A | 5/2017 |
| CN | 107316873 A | 11/2017 |
| EP | 3091390 A1 | 11/2016 |

OTHER PUBLICATIONS

First Office Action in the Chinese Patent Application No. 201811396701.6, dated Mar. 18, 2020; English translation attached.

\* cited by examiner

ARRAY SUBSTRATE, DISPLAY PANEL, DISPLAY APPARATUS, AND METHOD OF FABRICATING ARRAY SUBSTRATE

CROSS-REFERENCE TO RELATED APPLICATION

This application is a national stage application under 35 U.S.C. § 371 of International Application No. PCT/CN2019/082686, filed Apr. 15, 2019, which claims priority to Chinese Patent Application No. 201811396701.6, filed Nov. 22, 2018, the contents of which are incorporated by reference in the entirety.

TECHNICAL FIELD

The present invention relates to display technology, more particularly, to an array substrate, a display panel, a display apparatus, and a method of fabricating an array substrate.

BACKGROUND

Reflective display panels and transflective display panels are widely used in electronic price tags, smart ware, and outdoor portable equipment. The reflective display panels and transflective display panels can minimize power consumption without adversely affecting the display performances of the display panels. For example, the power consumption used by a reflective display panel is approximately tens of microwatts.

A display panel displaying with lower power consumption is mainly driven by low frequency voltage, Driven by the low frequency voltage, the time period used for displaying each frame is relatively long, usually longer than 1 second. If a time period of leakage of a subpixel is long, it is difficult for the subpixel to hold a certain pixel voltage. Especially for products with high Dots Per Inch (PPI), the size of each subpixel is small, it is more difficult for a subpixel to hold a certain pixel voltage, Especially in a display panel having high PPI and driven by low frequency voltage, the storage capacitance of each subpixel is too small to hold the voltage of each subpixel for a relatively long time.

SUMMARY

In one aspect, the present invention provides an array substrate having a plurality of subpixels, the array substrate in a respective one of the plurality of subpixels comprising a base substrate; a reflective electrode configured to reflect incident ambient light for image display in a reflective display mode; a first insulating layer on a side of the reflective electrode away from the base substrate; a pixel electrode configured to receive a data voltage for driving liquid crystal molecules and on a side of the first insulating layer away from the reflective electrode; a second insulating layer on a side of the pixel electrode away from the first insulating layer; and a common electrode configured to receive a common voltage and on a side of the second insulating layer away from the pixel electrode; wherein the common electrode is directly electrically connected to the reflective electrode through a first via extending through the first insulating layer and the second insulating layer; an orthographic projection of the common electrode on the base substrate at least partially overlaps with an orthographic projection of the pixel electrode on the base substrate; the common electrode, the second insulating layer, and the pixel electrode constitute a first capacitor; the orthographic projection of the pixel electrode on the base substrate at least partially overlaps with an orthographic projection of the reflective electrode on the base substrate; and the pixel electrode, the first insulating layer, and the reflective electrode constitute a second capacitor.

Optionally, the array substrate in the respective one of the plurality of subpixels further comprises a thin film transistor on the base substrate, and comprising a source electrode and a drain electrode electrically connected to the pixel electrode; and a third insulating layer on a side of the thin film transistor away from the base substrate; wherein the reflective electrode is on a side of the third insulating layer away from the thin film transistor; an orthographic projection of the drain electrode on the base substrate at least partially overlaps with the orthographic projection of the reflective electrode on the base substrate; and the drain electrode, the third insulating layer, and the reflective electrode constitute a third capacitor.

Optionally, the array substrate further comprises a common electrode signal line electrically connected to the common electrode; and a fourth insulating layer on a side of the common electrode signal line away from the base substrate; wherein the drain electrode is on a side of the fourth insulating layer away from the common electrode signal line; an orthographic projection of the common electrode signal line on the base substrate at least partially overlaps with the orthographic projection of the drain electrode on the base substrate; the common electrode signal line, the fourth insulating layer, and the drain electrode constitute a fourth capacitor; and the first capacitor, the second capacitor, the third capacitor, and the fourth capacitor are electrically connected to each other in parallel.

Optionally, the thin film transistor further comprises a gate electrode; wherein the common electrode signal line and the gate electrode are in a same layer and comprises a same material.

Optionally, the gate electrode has a double gate structure.

Optionally, the array substrate further comprises a plurality of gate lines and a plurality of data lines crossing over each other, thereby defining the plurality of subpixels; wherein, in the respective one of the plurality of subpixels, the gate electrode is electrically connected to a respective one of the plurality of gate lines, the source electrode is electrically connected to a respective one of the plurality of data lines, and an orthographic projection of the common electrode on the base substrate substantially covers orthographic projections of the respective one of the plurality of gate lines and the respective one of the plurality of data lines on the base substrate; and the common electrode extends substantially throughout the respective one of the plurality of subpixels.

Optionally, the reflective electrode extends substantially throughout the respective one of the plurality of subpixels.

Optionally, the common electrode is directly electrically connected to the reflective electrode through the first via extending through the first insulating layer and the second insulating layer, and through an first aperture extending through the pixel electrode; and a region corresponding to the first via is within a region corresponding to the first aperture.

Optionally, the common electrode in the array substrate comprises a plurality of common sub-electrodes separated from each other; the array substrate further comprises a plurality of touch control signal lines configured to transmit touch signals; and a respective one of the plurality of touch control signal lines is electrically connected to a respective one of the plurality of common sub-electrodes; wherein the array substrate is operated in a time-division driving mode comprising a display mode and a touch control mode; the plurality of common sub-electrodes are configured to receive a common voltage in the display mode; the plurality of common sub-electrodes are a plurality of touch electrodes configured to transmit touch signals in the touch control mode.

Optionally, the plurality of touch control signal lines and the reflective electrode are in a same layer and comprise a same material.

In another aspect, the present invention provides a display panel, comprising the array substrate described herein or fabricated by a method described herein, a counter substrate facing the array substrate, and a liquid crystal layer between the array substrate and the counter substrate.

In another aspect, the present invention provides a display apparatus, comprising the display panel described herein, and one or more integrated circuits connected to the array, substrate.

In another aspect, the present invention provides a method of fabricating an array substrate having a plurality of subpixels, the method comprising, in a respective one of the plurality of subpixels, forming a reflective electrode on a base substrate and configured to reflect incident ambient light for image display in a reflective display mode; forming a first insulating layer on a side of the reflective electrode away from the base substrate; forming a pixel electrode configured to receive a data voltage for driving liquid crystal molecules and on a side of the first insulating layer away from the reflective electrode; forming a second insulating layer on a side of the pixel electrode away from the first insulating layer; and forming a common electrode configured to receive a common voltage and on a side of the second insulating layer away from the pixel electrode; wherein the common electrode is formed to be directly electrically connected to the reflective electrode through a first via extending through the first insulating layer and the second insulating layer; an orthographic projection of the common electrode on the base substrate at least partially overlaps with an orthographic projection of the pixel electrode on the base substrate; the common electrode, the second insulating layer, and the pixel electrode are formed to constitute a first capacitor; the orthographic projection of the pixel electrode on the base substrate at least partially overlaps with an orthographic projection of the reflective electrode on the base substrate; and the pixel electrode, the first insulating layer, and the reflective electrode are formed to constitute a second capacitor.

Optionally, the method, in the respective one of the plurality of subpixels, further comprises forming a thin film transistor on the base substrate, the thin film transistor formed to comprise a source electrode and a drain electrode electrically connected to the pixel electrode; and forming a third insulating layer on a side of the thin film transistor away from the base substrate; wherein the reflective electrode is formed on a side of the third insulating layer away from the thin film transistor; an orthographic projection of the drain electrode on the base substrate at least partially overlaps with the orthographic projection of the reflective electrode on the base substrate; and the drain electrode, the third insulating layer, and the reflective electrode are formed to constitute a third capacitor.

Optionally, the method further comprises forming a common electrode signal line electrically connected to the common electrode; and forming a fourth insulating layer on a side of the common electrode signal line away from the base substrate; wherein the drain electrode is formed on a side of the fourth insulating layer away from the common electrode signal line; an orthographic projection of the common electrode signal line on the base substrate at least partially overlaps with the orthographic projection of the drain electrode on the base substrate; the common electrode signal line, the fourth insulating layer, and the drain electrode are formed to constitute a fourth capacitor; and the first capacitor, the second capacitor, the third capacitor, and the fourth capacitor are formed to be electrically connected to each other in parallel.

Optionally, the thin film transistor is formed to further comprise a gate electrode; wherein the common electrode signal line and the gate electrode are formed in a same layer using a same material in a same patterning process and using a single mask plate.

Optionally, the method further comprises forming a plurality of gate lines and a plurality of data lines crossing over each other, thereby defining the plurality of subpixels; wherein, in the respective one of the plurality of subpixels, the gate electrode is formed to be electrically connected to a respective one of the plurality of gate lines, the source electrode is formed to be electrically connected to a respective one of the plurality of data lines, and an orthographic projection of the common electrode on the base substrate substantially covers orthographic projections of the respective one of the plurality of gate lines and the respective one of the plurality of data lines on the base substrate; and the common electrode is formed to extend substantially throughout the respective one of the plurality of subpixels.

Optionally, the reflective electrode is formed to extend substantially throughout the respective one of the plurality of subpixels.

Optionally, the method further comprises forming a first aperture extending through the pixel electrode; wherein the common electrode is formed to be directly electrically connected to the reflective electrode through the first via extending through the first insulating layer and the second insulating layer, and through the first aperture extending through the pixel electrode; and a region corresponding to the first via is within a region corresponding to the first aperture.

Optionally, the common electrode in the array substrate is formed to comprise a plurality of common sub-electrodes separated from each other; the method further comprises forming a plurality of touch control signal lines configured to transmit touch signals; a respective one of the plurality of touch control signal lines is formed to be electrically, connected to a respective one of the plurality of common sub-electrodes; and the plurality of touch control signal lines and the reflective electrode are in a same layer using a same material in a same patterning process and using a single mask plate.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter Glia, an array substrate, a display panel, a display apparatus, and a method of fabricating an array substrate that substantially obviate one or more of the problems due to limitations and disadvantages of the related art. In one aspect, the present disclosure discloses an array substrate. In some embodiments, the array substrate has a plurality of subpixels. Optionally, the array substrate in a respective one of the plurality of subpixels includes a base substrate; a reflective electrode configured to reflect incident ambient light for image display in a reflective display mode; a first insulating layer on a side of the reflective electrode away from the base substrate; a pixel electrode configured to receive a data voltage for driving liquid crystal molecules and on a side of the first insulating layer away from the reflective electrode; a second insulating layer on a side of the pixel electrode away from the first insulating layer; and a common electrode configured to receive a common voltage and on a side of the second insulating layer away from the pixel electrode. Optionally, the common electrode is directly electrically connected to the reflective electrode through a first via extending through the first insulating layer and the second insulating layer. Optionally, an orthographic projection of the common electrode on the base substrate at least partially overlaps with an orthographic projection of the pixel electrode on the base substrate. Optionally, the common electrode, the second insulating layer, and the pixel electrode constitute a first capacitor. Optionally, the orthographic projection of the pixel electrode on the base substrate at least partially overlaps with an orthographic projection of the reflective electrode on the base substrate. Optionally, the pixel electrode, the first insulating layer, and the reflective electrode constitute a second capacitor.

Figure 1A:
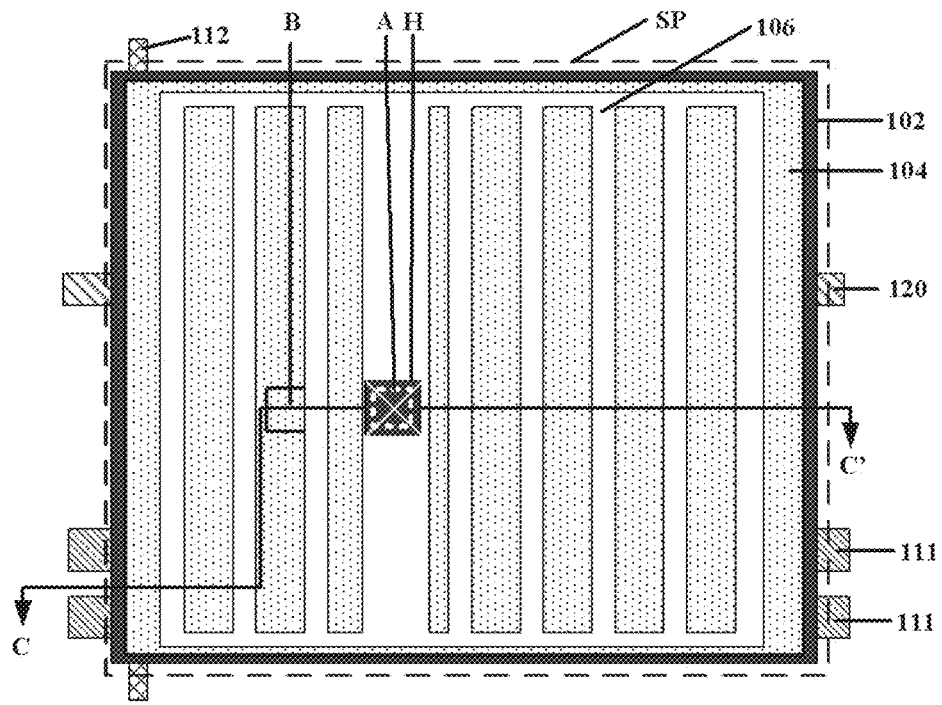
FIG. 1A is a plan view of a respective one of a plurality of subpixels of an array substrate in some embodiments according to the present disclosure.
Figure 2:
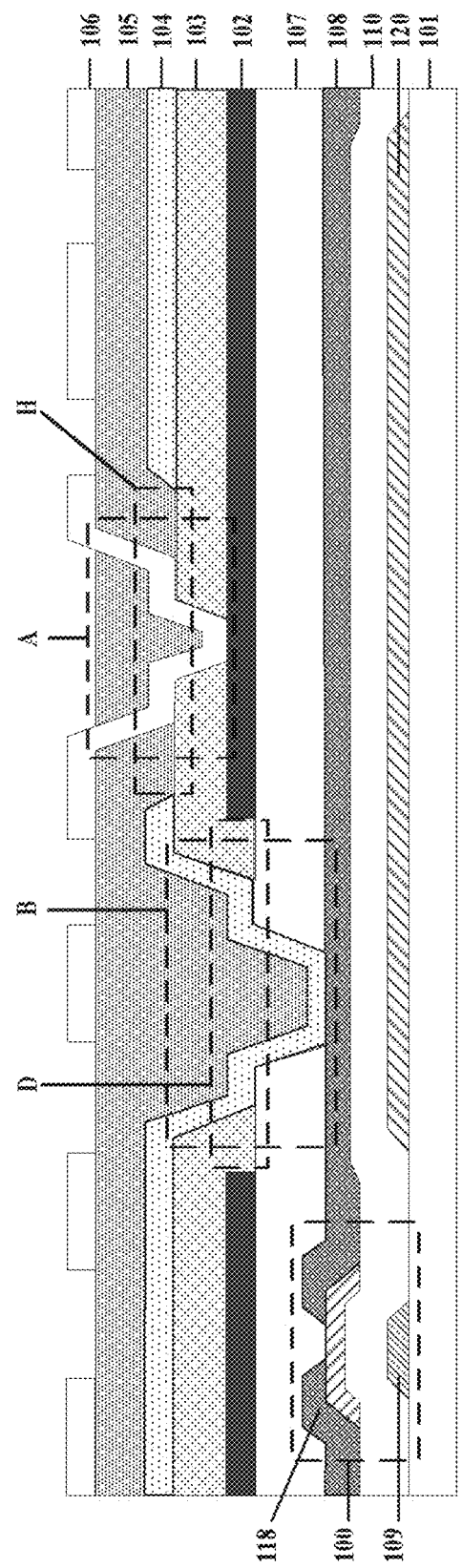
FIG. 2 is a cross-sectional view of an array substrate along a CC' direction in FIG. 1A.

FIG. 1A is a plan view of a respective one of the plurality of subpixels of an array substrate in some embodiments according to the present disclosure. FIG. 2 is a cross-sectional view of an array substrate along a CC' direction in FIG. 1A. Referring to FIG. 1A and FIG. 2, in some embodiments, an array substrate has a plurality of subpixels SR The array substrate in a respective one of the plurality of subpixels SP includes a base substrate 101; a reflective electrode 102 configured to reflect incident ambient light for image display in a reflective display mode; a first insulating layer 103 on a side of the reflective electrode 102 away from the base substrate 101; a pixel electrode 104 configured to receive a data voltage for driving liquid crystal molecules and on a side of the first insulating layer 103 away from the reflective electrode 102; a second insulating layer 105 on a side of the pixel electrode 104 away from the first insulating layer 103; and a common electrode 106 configured to receive a common voltage and on a side of the second insulating layer 105 away from the pixel electrode 104.

In some embodiments, referring to FIG. 2, the common electrode 106 is directly electrically connected to the reflective electrode 102. Optionally, the common electrode 106 is directly electrically connected to the reflective electrode 102 through a first via A extending through the first insulating layer 103 and the second insulating layer 105. Optionally, a common voltage (Vcom) is transmitted to the common electrode 106 through the reflective electrode 102.

In some embodiments, referring to FIG. 1A, the common electrode 106 extends substantially throughout the respective one of the plurality of subpixels SP. Optionally, an orthographic projection of the common electrode 106 on the base substrate 101 covers at least 30%, at least 40%, at least 50%, at least 60%, at least 70%, at least 80%, at least 90%, or at least 95% of an orthographic projection of the respective one of the plurality of subpixels SP on the base substrate 101.

As used herein, the term "substantially throughout" refers to, in a respective one of the plurality of subpixels, an orthographic projection of an element of the respective one of the plurality of subpixels on a base substrate covers at least 30%, at least 40%, at least 50%, at least 60%, at least 70%, at least 80%, at least 90%, or at least 95% of an orthographic projection of the respective one of the plurality of subpixels on the base substrate.

Figure 1B:
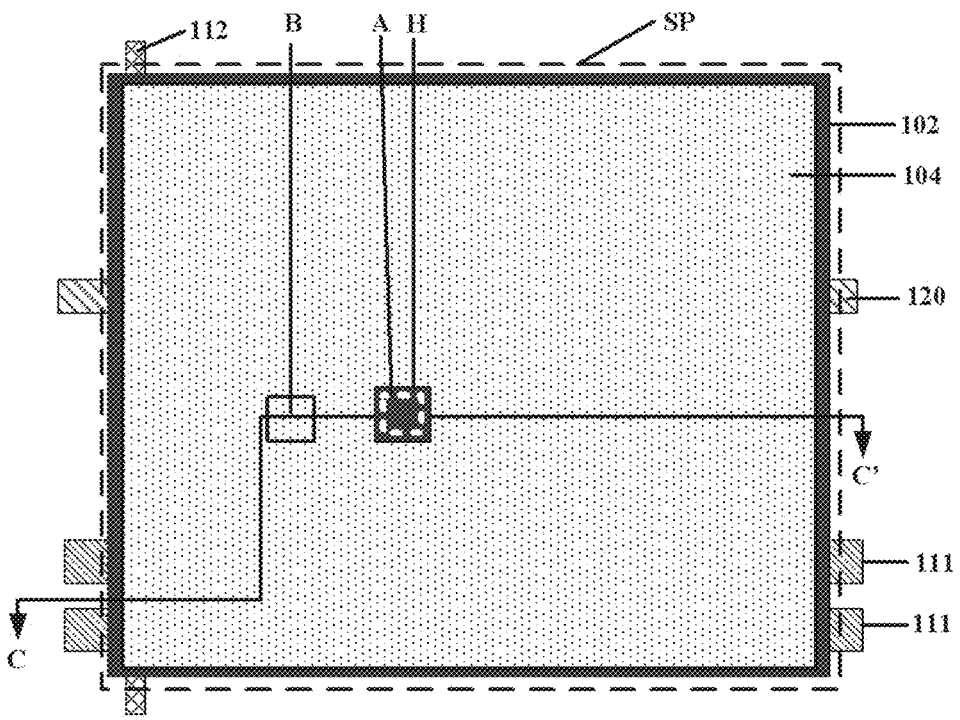
FIG. 1B is a schematic diagram illustrate a structure of a pixel electrode in some embodiments according to the present disclosure.

FIG. 1B is a schematic diagram illustrate a structure of a pixel electrode in some embodiments according to the present disclosure. Referring to FIG. 1B, the pixel electrode 104 extends substantially throughout the respective one of the respective one of the plurality of subpixels SP. Optionally, an orthographic projection of the pixel electrode 104 on the base substrate 101 covers at least 30%, at least 40%, at least 50%, at least 60%, at least 70%, at least 80%, at least 90%, or at least 95% of an orthographic projection of the respective one of the plurality of subpixels SP on the base substrate 101.

Figure 1C:
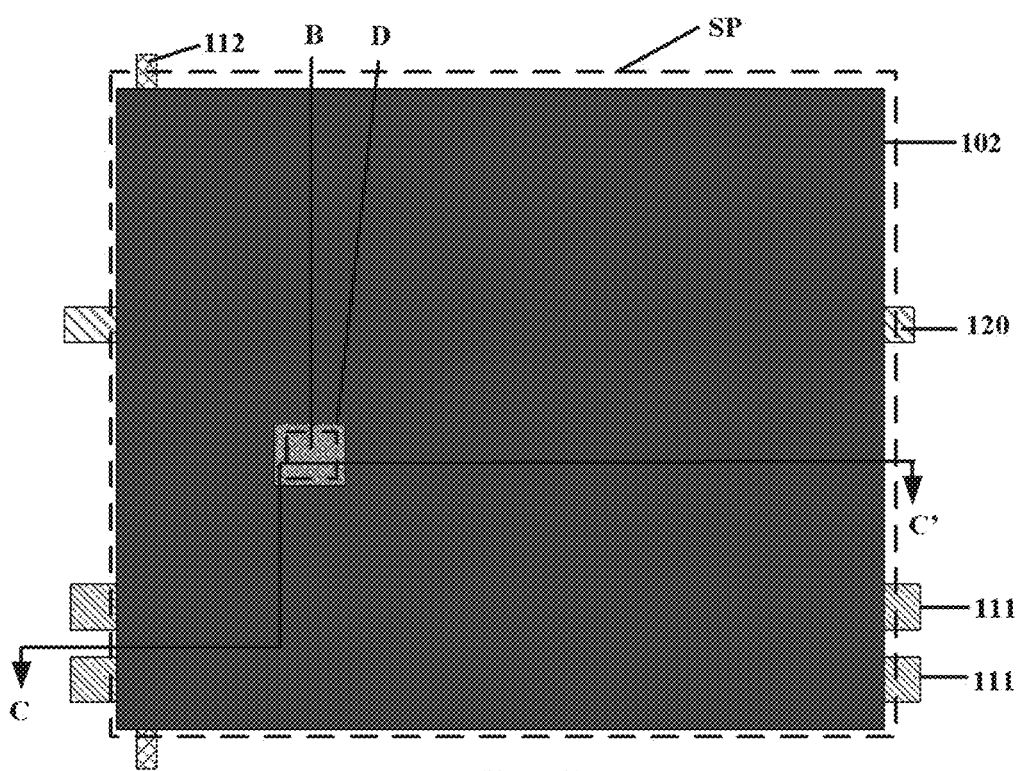
FIG. 1C is a schematic diagram illustrate a structure of a reflective electrode in some embodiments according to the present disclosure.

FIG. 1C is a schematic diagram illustrate a structure of a reflective electrode in some embodiments according to the present disclosure. Referring to FIG. 1C, in some embodiments, the reflective electrode 102 extends substantially throughout the respective one of the respective one of the plurality of subpixels SP. Optionally, an orthographic projection of the reflective electrode 102 on the base substrate 101 covers at least 30%, at least 40%, at least 50%, at least 60%, at least 70%, at least 80%, at least 90%, or at least 95% of an orthographic projection of the respective one of the plurality of subpixels SP on the base substrate 101.

Optionally, an orthographic projection of the reflective electrode 102 on the base substrate 101 covers an orthographic projection of the respective one of the plurality of subpixels SP on the base substrate 101. The reflective electrode 102 can reflect the incident ambient light out of the respective one of the plurality of subpixels, and ensure the brightness of a display substrate using the array substrate herein.

Referring to FIG. 1A, FIG. 1B and FIG. 2, in some embodiments, the common electrode 106 is directly electrically connected to the reflective electrode 102 through the first via A extending through the first insulating layer 103 and the second insulating layer 105, and through a first aperture H extending through the pixel electrode 104. FIG. 1B doesn't show any insulating layer, a layer on a side of the pixel electrode 104 facing the base substrate 101 is reflective electrode 102, so, the reflective electrode 102 is shown on the FIG. 1B through the first aperture H.

Optionally, referring to FIG. 2, the first via A extends through the first insulating layer 103 and the second insulating layer 105. Referring to FIG. 1B, a region corresponding to the first via A (shown by a white dotted line) is within a region corresponding to the first aperture H. Optionally, referring to FIG. 2, an orthographic projection of a cross section, having a maximum size, of the first aperture H on the base substrate 101 covers an orthographic projection of a cross section, having a maximum size, of the first via A on the base substrate 101. The relationship between the first aperture H and the first via A may prevent the common electrode 106 and the pixel electrode 104 from connecting with each other or getting closer to each other, which may avoid the cross talk between the common voltage transmitted by the common electrode 106 and the data voltage transmitted by the pixel electrode 104.

In some embodiments, an orthographic projection of the common electrode 106 on the base substrate 101 at least partially overlaps with an orthographic projection of the pixel electrode 104 on the base substrate 101.

Figure 3:
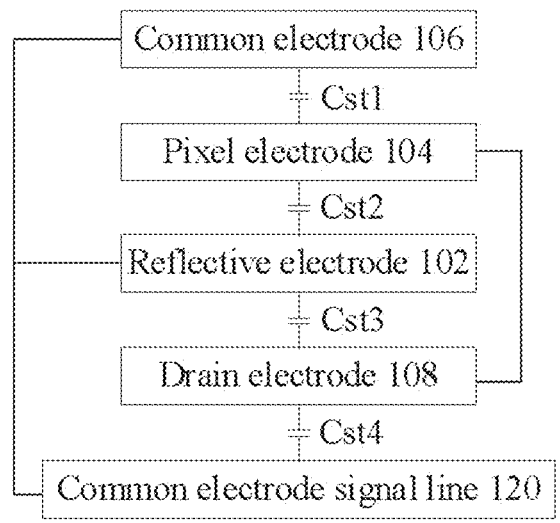
FIG. 3 is a schematic diagram illustrating capacitors electrically connected in an array substrate in some embodiments according to the present disclosure.

FIG. 3 is a schematic diagram illustrating capacitors electrically connected in an array substrate in some embodiments according to the present disclosure, Referring to FIG. 2 and FIG. 3, in some embodiments, the common electrode 106, the second insulating layer 105, and the pixel electrode 104 constitute a first capacitor Cst1.

In some embodiments, referring to FIG. 2, the orthographic projection of the pixel electrode 104 on the base substrate 101 at least partially overlaps with an orthographic projection of the reflective electrode 102 on the base substrate 101.

In some embodiments, referring to FIG. 2 and FIG. 3, the pixel electrode 104, the first insulating layer 103, and the reflective electrode 102 constitute a second capacitor Cst2.

In some embodiments, by electronically connecting the common electrode 106 with the reflective electrode 102, the first capacitor Cst1 and the second capacitor Cst2 are formed electrically connecting with each other in parallel, which increases a capacitance of the respective one of the plurality of subpixels SP, and further improves voltage holding ability of the respective one of the plurality of subpixels SP in an array substrate having high PPI and driven by a low frequency voltage.

In some embodiments, referring to FIG. 2, in the respective one of the plurality of subpixels SP, the array substrate farther includes a thin film transistor 100 on the base substrate 101, and a third insulating layer 107 on a side of the thin film transistor 100 away from the base substrate 101.

In some embodiments, the thin film transistor 100 includes a source electrode 118 and a drain electrode 108, Optionally, the drain electrode 108 is electrically connected to the pixel electrode 104.

Referring to FIG. 1B and FIG. 2, optionally, the drain electrode 108 is electrically connected to the pixel electrode 104 through a second via B extending through the first insulating layer 103 and the third insulating layer 107. Optionally, a data voltage is transmitted to the pixel electrode 104 through the drain electrode 108.

Various appropriate materials may be used for making the third insulating layer 107, Examples of suitable materials used for making the third insulating layer 107 include, but are not limited to resin, Optionally, the third insulating layer 107 is a resin layer.

Referring to FIG. 1B, FIG. 1C, and FIG. 2, in some embodiments, the pixel electrode 104 is directly electrically connected to the drain electrode 108 through the second via B extending through the first insulating layer 103 and the third insulating layer 107, and through a second aperture D extending through the reflective electrode 102. FIG. 1C doesn't show any insulating layer, the layer on a side of the reflective electrode 102 facing the base substrate 101 is the drain electrode 108, so, the drain electrode 108 is shown on the FIG. 1C through the second aperture D.

Optionally, referring to FIG. 2, the second via B extends through the first insulating layer 103 and the third insulating layer 107. Referring to FIG. 1C and FIG. 2, a region corresponding to the second via B (shown by a dotted line) is within a region corresponding to the second aperture D. Optionally, an orthographic projection of a cross section, having a maximum size, of the second aperture D on the base substrate 101 covers an orthographic projection of a cross section, having a maximum size, of the second via B on the base substrate 101, The relationship between the second aperture D and the second via B may prevent the pixel electrode 104 and the reflective electrode 102 from connecting with each other or getting closer to each other, which may avoid the cross talk between the signals transmitted by the pixel electrode 104 and by the reflective electrode 102.

In some embodiments, the reflective electrode 102 is on a side of the third insulating layer 107 away from the thin film transistor 100, An orthographic projection of the drain electrode 108 on the base substrate 101 at least partially overlaps with the orthographic projection of the reflective electrode 102 on the base substrate 101.

In some embodiments, referring to FIG. 2 and FIG. 3, the drain electrode 108, the third insulating layer 107, and the reflective electrode 102 constitute a third capacitor Cst3.

In some embodiments, by electronically connecting the drain electrode 108 with the pixel electrode 104, the first capacitor Cst1, the second capacitor Cst2, and the third capacitor Cst3 are formed electrically connecting with each other in parallel, which increases the capacitance of the respective one of the plurality of subpixels SP, and further improves voltage holding ability of the respective one of the plurality of subpixels SP in the array substrate having high PPI and driven by a low frequency voltage.

In some embodiments, referring to FIG. 2, in the respective one of the plurality of subpixels, the array substrate further includes a common electrode signal line 120 electrically connected to the common electrode 106; and a fourth insulating layer 110 on a side of the common electrode signal line 120 away from the base substrate 101. Optionally, the fourth insulating layer 110 is a gate insulating layer. For example, the fourth insulating layer 110 is between the drain electrode 108 and the gate electrode 109.

In some embodiments, the drain electrode 108 is on a side of the fourth insulating layer 110 away from the common electrode signal line 120.

In some embodiments, an orthographic projection of the common electrode signal line 120 on the base substrate 101 at least partially overlaps with the orthographic projection of the drain electrode 108 on the base substrate 101.

In some embodiments, referring to FIG. 2 and FIG. 3, the common electrode signal line 120, the fourth insulating layer 110, and the drain electrode 108 constitute a fourth capacitor Cst4, Optionally, by electronically connecting the common electrode 106 with the reflective electrode 102 and electronically connecting the drain electrode 108 with the pixel electrode 104, the first capacitor Cst1, the second capacitor Cst2, the third capacitor Cst3, and the fourth capacitor Cst4 are electrically connected to each other in parallel, which increases the capacitance of the respective one of the plurality of subpixels SP, and further improves voltage holding ability of the respective one of the plurality of subpixels SP in the array substrate having high PPI and driven by a low frequency voltage.

Figure 1D:
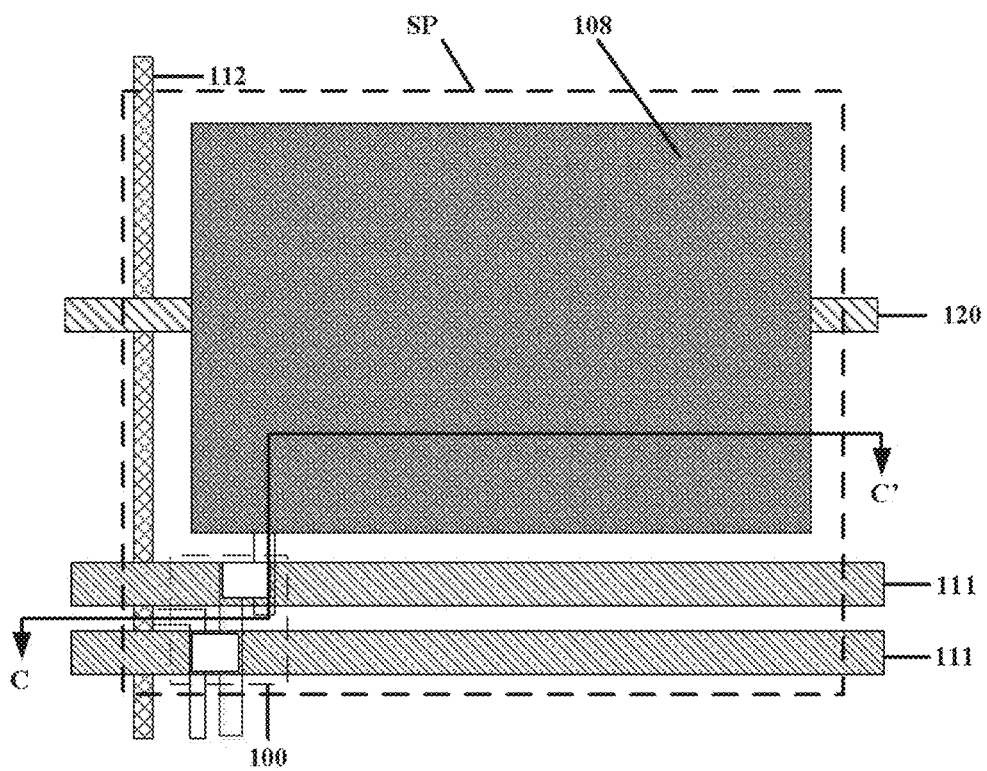
FIG. 1D is a schematic diagram illustrate a structure of a drain electrode in some embodiments according to the present disclosure.

FIG. 1D is a schematic diagram illustrate a structure of a drain electrode in some embodiments according to the present disclosure, Referring to FIG. 1D, the drain electrode 108 extends substantially throughout the respective one of the respective one of the plurality of subpixels SR Optionally, an orthographic projection of the drain electrode 108 on the base substrate 101 covers at least 30%, at least 40%, at least 50%, at least 60%, at least 70%, at least 80%, at least 90%, or at least 95% of an orthographic projection of the respective one of the plurality of subpixels SP on the base substrate 101.

Figure 1E:
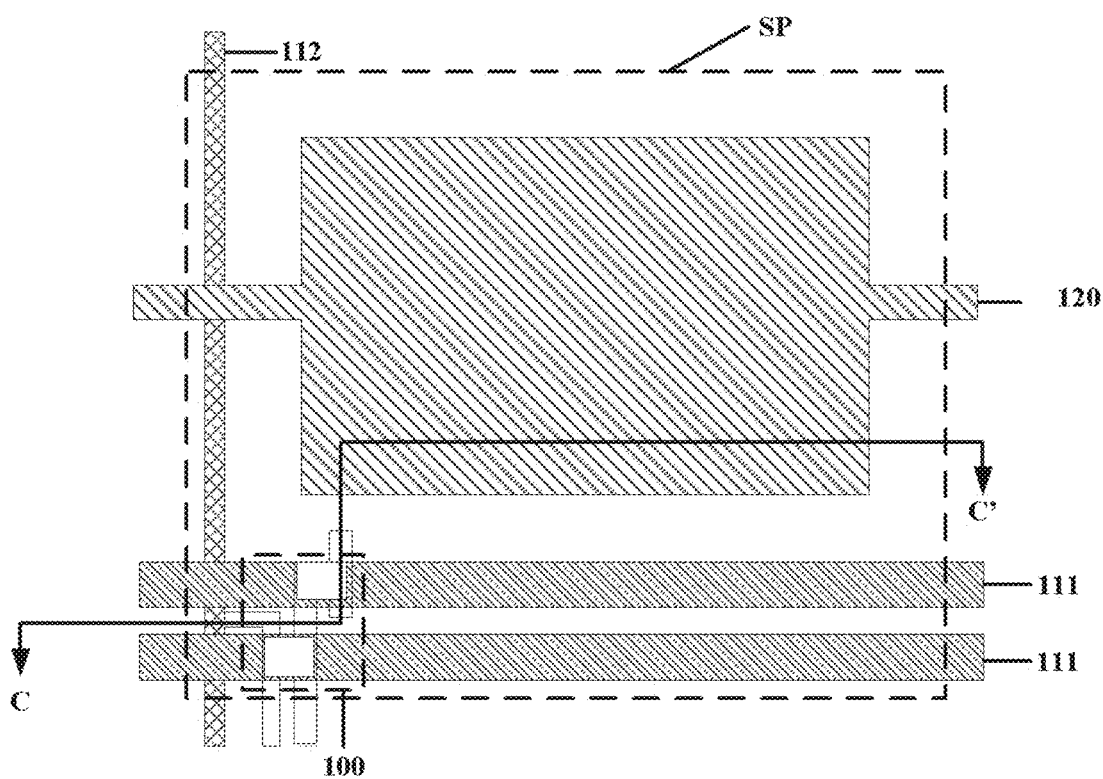
FIG. 1E is a schematic diagram illustrate a structure of a common electrode signal line in some embodiments according to the present disclosure.

FIG. 1E is a schematic diagram illustrate a structure of a common electrode signal line in some embodiments according to the present disclosure. Referring to FIG. 1E, the common electrode signal line 120 extends substantially throughout the respective one of the respective one of the plurality of subpixels SP. Optionally, an orthographic projection of the common electrode signal line 120 on the base substrate 101 covers at least 30%, at least 40%, at least 50%, at least 60%, at least 70%, at least 80%, at least 90%, or at least 95% of an orthographic projection of the respective one of the plurality of subpixels SP on the base substrate 101.

In some embodiments, referring to FIG. 2, in the respective one of the plurality of subpixels, the array substrate further includes a gate electrode 109. Optionally, the common electrode signal line 120 and the gate electrode 109 are in a same layer and includes a same material.

As used herein, the term "same layer" refers to the relationship between the layers simultaneously formed in the same step. In one example, the common electrode signal line 120 and the gate electrode 109 are in a same layer when they are formed as a result of one or more steps of a same patterning process performed in a same layer of material. In another example, the common electrode signal line 120 and the gate electrode 109 can be formed in a same layer by simultaneously performing the step of forming the common electrode signal line 120 and the step of forming the gate electrode 109, The term "same layer" does not always mean that the thickness of the layer or the height of the layer in a cross-sectional view is the same.

Optionally, the gate electrode 109 has a double gate structure which can avoid the problem of leakage of the thin film transistor 100. Optionally, the array substrate includes two thin film transistors in a respective one of the plurality of subpixels SP.

In some embodiments, referring to FIG. 1E and FIG. 2, the array substrate further include a plurality of gate lines 111 and a plurality of data lines 112 crossing over each other to define the plurality of subpixels SP, Optionally, in the respective one of the plurality of subpixels, the gate electrode 109 is electrically connected to a respective one of the plurality of gate lines 111. The source electrode 118 is electrically connected to a respective one of the plurality of data lines 112.

Figure 4:
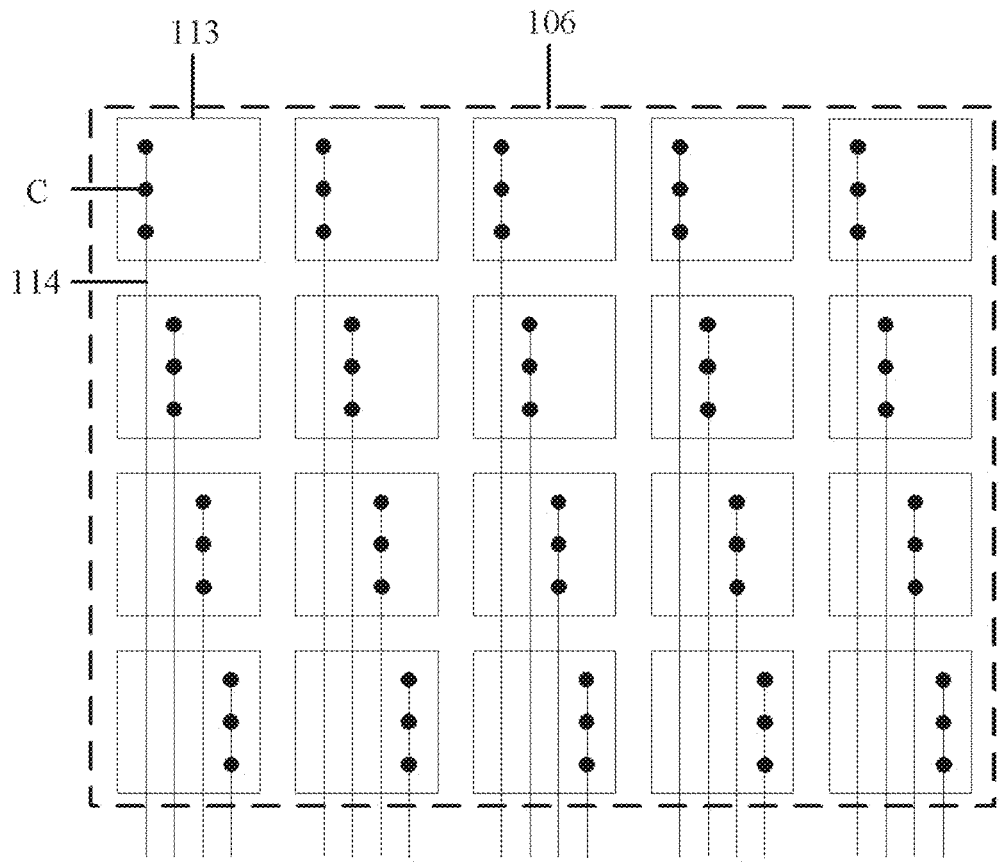
FIG. 4 is a schematic diagram illustrating a structure of an array substrate in some embodiments according to the present disclosure.

Optionally, an orthographic projection of the common electrode 106 on the base substrate 101 substantially covers orthographic projections of the respective one of the plurality of gate lines 111 and the respective one of the plurality of data lines 112 on the base substrate 101. This arrangement may avoid a cross talk between a gate line signal of the respective one of the plurality of gate lines 111 and a data signal of the pixel electrode 104, and a cross talk between a data voltage of the respective one of the plurality of data lines 112 and a data voltage of the pixel electrode 104, which may reduce the brightness difference between frames and reduce the display panel flickering, FIG. 4 is a schematic diagram illustrating a structure of an array substrate in some embodiments according to the present disclosure, Referring to FIG. 4, in some embodiments, the common electrode 106 in the array substrate includes a plurality of common sub-electrode 113 separated from each other. Optionally, the arrays substrate further includes a plurality of touch control signal lines 114 configured to transmit touch signals, Optionally, a respective one of the plurality of touch control signal lines 114 is electrically connected to a respective one of the plurality of common sub-electrodes 113.

Optionally, two common sub-electrodes of the plurality of common sub-electrodes 113 are insulated with each other.

Optionally, the plurality of touch control signal lines 114 and the reflective electrode are in a same layer and include a same material.

In some embodiments, the array substrate is operated in a time-division driving mode including a display mode and a touch control mode. Optionally, the plurality of common sub-electrodes 113 are configured to receive a common voltage in the display mode. Optionally, the plurality of common sub-electrodes 113 are a plurality of touch electrodes configured to transmit touch signals in the touch control mode.

For example, by dividing the common electrode 106 into the plurality of common sub-electrodes 113, and the plurality of common sub-electrodes 113 are a plurality of touch electrodes configured to transmit touch signals in the touch control mode. It is unnecessary to independently form a plurality of touch electrodes, the plurality of common sub-electrodes 113 can either perform display function in a display mode, or perform touch-sensing function in a touch control mode, which may lower the fabricating cost and make the array substrate thinner.

In some embodiments, the respective one of the plurality of common sub-electrode 113 includes a plurality of strip-shaped electrodes connected with each other. Optionally, one of the plurality of strip-shaped electrodes is connected to the respective one of the plurality of touch control signal lines 114 through a third via C, which may maximize the reflective rate of the respective one of the plurality of subpixels, as well as allow the respective one of the plurality of subpixels to perform the touch control function.

In some embodiments, the array substrate further include a touch-control chip configured to provide touch control signal to the respective one of the plurality of common sub-electrodes through the respective one of the plurality of touch control signal lines, and to recognize a position of touch based on a feedback signal sent from the respective one of the plurality of common sub-electrodes through the respective one of the plurality of touch control signal lines.

In some embodiments, referring to FIG. 2 and FIG. 4, the reflective electrode is the respective one of the plurality of touch control signal lines, Optionally, one of the plurality of common sub-electrodes 113 is connected to the respective one of the plurality of touch control signal lines 114 through the first via A. Optionally, the reflective electrode 102 is different from the respective one of the plurality of touch control signal lines 114.

For example, the plurality of common sub-electrodes 113 are a plurality of touch electrodes. Within a time period to display one frame, the display function and the touch control function can be performed in different time sub-periods. In a first time sub-period, the touch control mode is performed, a touch signal is sent to the respective one of the plurality of common sub-electrodes 113 through the respective one of the plurality of touch control signal lines 114. In a second time sub-period, the display mode is performed, the common voltage is sent to the plurality of common sub-electrodes 113 through the respective one of the plurality of touch control signal lines 114 and the common electrode signal line. Optionally, in a first time sub-period, the touch control mode is performed, a touch signal is sent to the respective one of the plurality of common sub-electrodes 113 through the respective one of the plurality of touch control signal lines 114. In a second time sub-period, the display mode is performed, the common voltage is sent to the plurality of common sub-electrodes 113 through the common electrode signal line.

Figure 5:
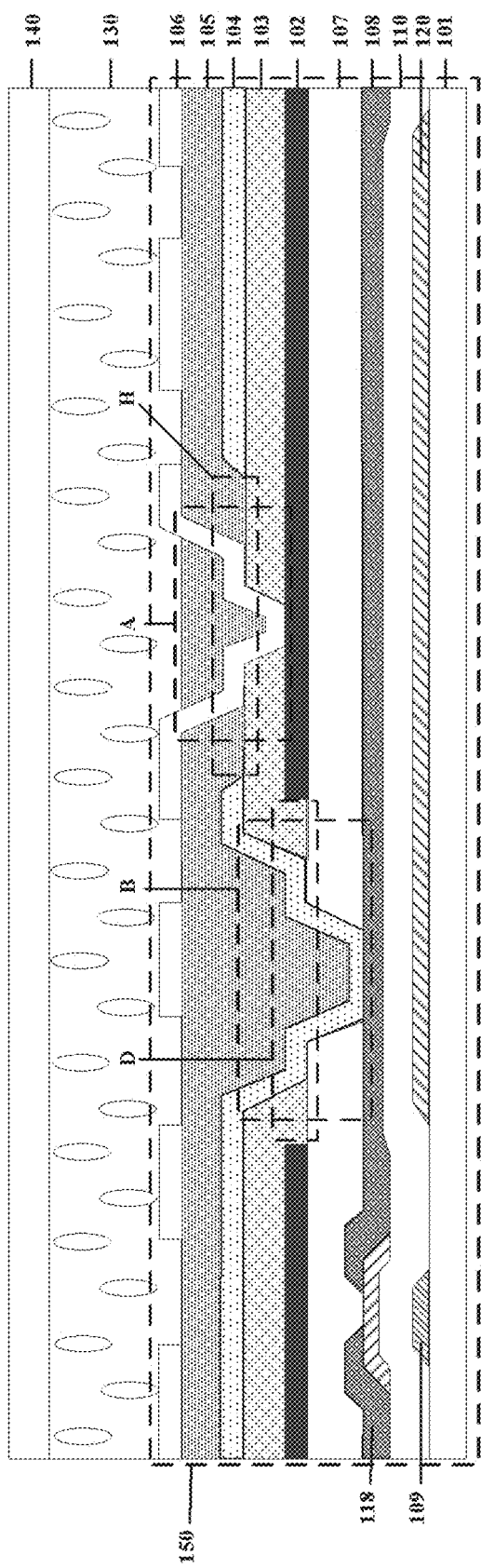
FIG. 5 is a schematic diagram illustrating a structure of a display panel in some embodiments according to the present disclosure.

In another aspect, the present disclosure also provides a display panel, FIG. 5 is a schematic diagram illustrating a structure of a display panel in some embodiments according to the present disclosure, Referring to FIG. 5, in some embodiments, the display panel includes the array substrate 150 described herein, a counter substrate 140 facing the array substrate 101, and a liquid crystal layer 130 between the array substrate 150 and the counter substrate 140.

Optionally, the display panel is a reflective display panel, Optionally, the display panel is a transflective display panel.

In another aspect, the present disclosure also provides a display apparatus. In some embodiments, the display apparatus includes the display panel herein, and one or more integrated circuits connected to the display panel. Examples of appropriate display apparatuses include, but are not limited to, an electronic paper, a mobile phone, a tablet computer, a television, a monitor, a notebook computer, a digital album, a GPS, etc.

In some embodiments, the array substrate, the display panel, and the display apparatus described herein includes a plurality of subpixels, A respective one of the plurality of subpixels includes a base substrate; a reflective electrode configured to reflect incident ambient light for image display in a reflective display mode; a first insulating layer on a side of the reflective electrode away from the base substrate; a pixel electrode configured to receive a data voltage for driving liquid crystal molecules and on a side of the first insulating layer away from the reflective electrode; a second insulating layer on a side of the pixel electrode away from the first insulating layer; a common electrode configured to receive a common voltage and on a side of the second insulating layer away from the pixel electrode; a thin film transistor on the base substrate, and including a source electrode and a drain electrode electrically connected to the pixel electrode; a third insulating layer on a side of the thin film transistor away from the base substrate; a common electrode signal line electrically connected to the common electrode; and a fourth insulating layer on a side of the common electrode signal line away from the base substrate.

Optionally, common electrode is directly electrically connected to the reflective electrode through a first via extending through the first insulating layer and the second insulating layer, and the drain electrode electrically is connected to the pixel electrode. Optionally, the common electrode, the second insulating layer, and the pixel electrode constitute a first capacitor. Optionally, the pixel electrode, the first insulating layer, and the reflective electrode constitute a second capacitor, Optionally, the drain electrode, the third insulating layer, and the reflective electrode constitute a third capacitor. Optionally, the common electrode signal line, the fourth insulating layer, and the drain electrode constitute a fourth capacitor.

By electronically connecting the common electrode 106 with the reflective electrode 102 and electronically connecting the drain electrode 108 with the pixel electrode 104, the first capacitor, the second capacitor, the third capacitor, and the fourth capacitor are electrically connected to each other in parallel, which can increase the capacitance of the respective one of the plurality of subpixels SP, and further improves voltage holding ability of the respective one of the plurality of subpixels SP in the array substrate having high PPI and driven by a low frequency voltage.

Moreover, the common electrodes includes a plurality of common sub-electrodes which are a plurality of touch electrodes configured to transmit touch signals in the touch control mode. The plurality of common sub-electrodes can perform display function in a display mode, and perform touch sensing function in a touch control mode, which may lower the fabricating cost and make the array substrate thinner.

In another aspect, the present disclosure also provides a method of fabricating an array substrate having a plurality of subpixels. In some embodiments, in a respective one of the plurality of subpixels, the method of fabricating an array substrate includes forming a reflective electrode on a base substrate and configured to reflect incident ambient light for image display in a reflective display mode; forming a first insulating layer on a side of the reflective electrode away from the base substrate; forming a pixel electrode configured to receive a data voltage for driving liquid crystal molecules and on a side of the first insulating layer away from the reflective electrode; forming a second insulating layer on a side of the pixel electrode away from the first insulating layer; and forming a common electrode configured to receive a common voltage and on a side of the second insulating layer away from the pixel electrode.

Optionally, the common electrode is formed to be directly electrically connected to the reflective electrode through a first via extending through the first insulating layer and the second insulating layer. Optionally, an orthographic projection of the common electrode on the base substrate at least partially overlaps with an orthographic projection of the pixel electrode on the base substrate. Optionally, the common electrode, the second insulating layer, and the pixel electrode are formed to constitute a first capacitor. Optionally, the orthographic projection of the pixel electrode on the base substrate at least partially overlaps with an orthographic projection of the reflective electrode on the base substrate. Optionally, the pixel electrode, the first insulating layer, and the reflective electrode are formed to constitute a second capacitor.

In some embodiments, in the respective one of the plurality of subpixels, the method further includes forming a thin film transistor on the base substrate, the thin film transistor formed to include a source electrode and a drain electrode electrically connected to the pixel electrode; and forming a third insulating layer on a side of the thin film transistor away from the base substrate. Optionally, the reflective electrode is formed on a side of the third insulating layer away from the thin film transistor. Optionally, an orthographic projection of the drain electrode on the base substrate at least partially overlaps with the orthographic projection of the reflective electrode on the base substrate. Optionally, the drain electrode, the third insulating layer, and the reflective electrode are formed to constitute a third capacitor.

In some embodiments, the method further includes forming a common electrode signal line electrically connected to the common electrode; and forming a fourth insulating layer on a side of the common electrode signal line away from the base substrate. Optionally, the drain electrode is formed on a side of the fourth insulating layer away from the common electrode signal line. Optionally, an orthographic projection of the common electrode signal line on the base substrate at least partially overlaps with the orthographic projection of the drain electrode on the base substrate. Optionally, the common electrode signal line, the fourth insulating layer, and the drain electrode are formed to constitute a fourth capacitor. Optionally, the first capacitor, the second capacitor, the third capacitor, and the fourth capacitor are formed to be electrically connected to each other in parallel.

In some embodiments, in the respective one of the plurality of subpixels, thin film transistor is formed to further include a gate electrode. Optionally, the common electrode signal line and the gate electrode are formed in a same layer using a same material in a same patterning process and using a single mask plate.

In some embodiments, the method further includes forming a plurality of gate lines and a plurality of data lines crossing over each other, thereby defining the plurality of subpixels. Optionally, in the respective one of the plurality of subpixels, the gate electrode is formed to be electrically connected to a respective one of the plurality of gate lines, the source electrode is formed to be electrically connected to a respective one of the plurality of data lines, and an orthographic projection of the common electrode on the base substrate substantially covers orthographic projections of the respective one of the plurality of gate lines and the respective one of the plurality of data lines on the base substrate; and the common electrode is formed to extend substantially throughout the respective one of the plurality of subpixels.

In some embodiments, the reflective electrode is formed to extend substantially throughout the respective one of the plurality of subpixels.

In some embodiments, in the respective one of the plurality of subpixels, the method further includes including forming a first aperture extending through the pixel electrode. Optionally, the common electrode is formed to be directly electrically connected to the reflective electrode through the first via extending through the first insulating layer and the second insulating layer, and through the first aperture extending through the pixel electrode; and a region corresponding to the first via is within a region corresponding to the first aperture.

In some embodiments, the common electrode in the array substrate is formed to include a plurality of common sub-electrodes separated from each other. The method further includes forming a plurality of touch control signal lines configured to transmit touch signals. Optionally, a respective one of the plurality of touch control signal lines is formed to be electrically connected to a respective one of the plurality of common sub-electrodes. Optionally, the plurality of touch control signal lines and the reflective electrode are in a same layer using a same material in a same patterning process and using a single mask plate.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An array substrate having a plurality of subpixels, the array substrate in a respective one of the plurality of subpixels comprising:
    a base substrate;
    a reflective electrode configured to reflect incident ambient light for image display in a reflective display mode;
    a first insulating layer on a side of the reflective electrode away from the base substrate;
    a pixel electrode configured to receive a data voltage for driving liquid crystal molecules and on a side of the first insulating layer away from the reflective electrode;
    a second insulating layer on a side of the pixel electrode away from the first insulating layer; and
    a common electrode configured to receive a common voltage and on a side of the second insulating layer away from the pixel electrode;
    wherein the common electrode is directly electrically connected to the reflective electrode through a first via extending through the first insulating layer and the second insulating layer;
    an orthographic projection of the common electrode on the base substrate at least partially overlaps with an orthographic projection of the pixel electrode on the base substrate;
    the common electrode, the second insulating layer, and the pixel electrode constitute a first capacitor;

the orthographic projection of the pixel electrode on the base substrate at least partially overlaps with an orthographic projection of the reflective electrode on the base substrate; and the pixel electrode, the first insulating layer, and the reflective electrode constitute a second capacitor.

2. The array substrate of claim 1, in the respective one of the plurality of subpixels, further comprising:
a thin film transistor on the base substrate, and comprising a source electrode and a drain electrode electrically connected to the pixel electrode; and
a third insulating layer on a side of the thin film transistor away from the base substrate;
wherein the reflective electrode is on a side of the third insulating layer away from the thin film transistor;
an orthographic projection of the drain electrode on the base substrate at least partially overlaps with the orthographic projection of the reflective electrode on the base substrate; and
the drain electrode, the third insulating layer, and the reflective electrode constitute a third capacitor.

3. The array substrate of claim 2, further comprising a common electrode signal line electrically connected to the common electrode; and
a fourth insulating layer on a side of the common electrode signal line away from the base substrate;
wherein the drain electrode is on a side of the fourth insulating layer away from the common electrode signal line;
an orthographic projection of the common electrode signal line on the base substrate at least partially overlaps with the orthographic projection of the drain electrode on the base substrate;
the common electrode signal line, the fourth insulating layer, and the drain electrode constitute a fourth capacitor; and
the first capacitor, the second capacitor, the third capacitor, and the fourth capacitor are electrically connected to each other in parallel.

4. The array substrate of claim 3, wherein the thin film transistor further comprises a gate electrode;
wherein the common electrode signal line and the gate electrode are in a same layer and comprises a same material.

5. The array substrate of claim 4, wherein the gate electrode has a double gate structure.

6. The array substrate of claim 1, further comprising a plurality of gate lines and a plurality of data lines crossing over each other, thereby defining the plurality of subpixels;
wherein, in the respective one of the plurality of subpixels, the gate electrode is electrically connected to a respective one of the plurality of gate lines, the source electrode is electrically connected to a respective one of the plurality of data lines, and an orthographic projection of the common electrode on the base substrate substantially covers orthographic projections of the respective one of the plurality of gate lines and the respective one of the plurality of data lines on the base substrate; and
the common electrode extends substantially throughout the respective one of the plurality of subpixels.

7. The array substrate of claim 6, wherein the reflective electrode extends substantially throughout the respective one of the plurality of subpixels.

8. The array substrate of claim 1, wherein the common electrode is directly electrically connected to the reflective electrode through the first via extending through the first insulating layer and the second insulating layer, and through a first aperture extending through the pixel electrode; and
a region corresponding to the first via is within a region corresponding to the first aperture.

9. The array substrate of claim 1, wherein the common electrode in the array substrate comprises a plurality of common sub-electrodes separated from each other;
the array substrate further comprises a plurality of touch control signal lines configured to transmit touch signals; and
a respective one of the plurality of touch control signal lines is electrically connected to a respective one of the plurality of common sub-electrodes;
wherein the array substrate is operated in a time-division driving mode comprising a display mode and a touch control mode;
the plurality of common sub-electrodes are configured to receive a common voltage in the display mode;
the plurality of common sub-electrodes are a plurality of touch electrodes configured to transmit touch signals in the touch control mode.

10. The array substrate of claim 9, wherein the plurality of touch control signal lines and the reflective electrode are in a same layer and comprise a same material.

11. A display panel, comprising the array substrate of claim 1, a counter substrate facing the array substrate, and a liquid crystal layer between the array substrate and the counter substrate.

12. A display apparatus, comprising the display panel of claim 11, and one or more integrated circuits connected to the array substrate.

13. A method of fabricating an array substrate having a plurality of subpixels, the method comprising, in a respective one of the plurality of subpixels:
forming a reflective electrode on a base substrate and configured to reflect incident ambient light for image display in a reflective display mode;
forming a first insulating layer on a side of the reflective electrode away from the base substrate;
forming a pixel electrode configured to receive a data voltage for driving liquid crystal molecules and on a side of the first insulating layer away from the reflective electrode;
forming a second insulating layer on a side of the pixel electrode away from the first insulating layer; and
forming a common electrode configured to receive a common voltage and on a side of the second insulating layer away from the pixel electrode;
wherein the common electrode is formed to be directly electrically connected to the reflective electrode through a first via extending through the first insulating layer and the second insulating layer;
an orthographic projection of the common electrode on the base substrate at least partially overlaps with an orthographic projection of the pixel electrode on the base substrate;
the common electrode, the second insulating layer, and the pixel electrode are formed to constitute a first capacitor;
the orthographic projection of the pixel electrode on the base substrate at least partially overlaps with an orthographic projection of the reflective electrode on the base substrate; and
the pixel electrode, the first insulating layer, and the reflective electrode are formed to constitute a second capacitor.

14. The method of claim 13, in the respective one of the plurality of subpixels, further comprising:
- forming a thin film transistor on the base substrate, the thin film transistor formed to comprise a source electrode and a drain electrode electrically connected to the pixel electrode; and
- forming a third insulating layer on a side of the thin film transistor away from the base substrate;
- wherein the reflective electrode is formed on a side of the third insulating layer away from the thin film transistor;
- an orthographic projection of the drain electrode on the base substrate at least partially overlaps with the orthographic projection of the reflective electrode on the base substrate; and
- the drain electrode, the third insulating layer, and the reflective electrode are formed to constitute a third capacitor.

15. The method of claim 14, further comprising forming a common electrode signal line electrically connected to the common electrode; and
- forming a fourth insulating layer on a side of the common electrode signal line away from the base substrate;
- wherein the drain electrode is formed on a side of the fourth insulating layer away from the common electrode signal line;
- an orthographic projection of the common electrode signal line on the base substrate at least partially overlaps with the orthographic projection of the drain electrode on the base substrate;
- the common electrode signal line, the fourth insulating layer, and the drain electrode are formed to constitute a fourth capacitor; and
- the first capacitor, the second capacitor, the third capacitor, and the fourth capacitor are formed to be electrically connected to each other in parallel.

16. The method of claim 15, wherein the thin film transistor is formed to further comprise a gate electrode;
- wherein the common electrode signal line and the gate electrode are formed in a same layer using a same material in a same patterning process and using a single mask plate.

17. The method of claim 13, further comprising forming a plurality of gate lines and a plurality of data lines crossing over each other, thereby defining the plurality of subpixels;
- wherein, in the respective one of the plurality of subpixels, the gate electrode is formed to be electrically connected to a respective one of the plurality of gate lines, the source electrode is formed to be electrically connected to a respective one of the plurality of data lines, and an orthographic projection of the common electrode on the base substrate substantially covers orthographic projections of the respective one of the plurality of gate lines and the respective one of the plurality of data lines on the base substrate; and
- the common electrode is formed to extend substantially throughout the respective one of the plurality of subpixels.

18. The method of claim 17, wherein the reflective electrode is formed to extend substantially throughout the respective one of the plurality of subpixels.

19. The method of claim 13, further comprising forming a first aperture extending through the pixel electrode;
- wherein the common electrode is formed to be directly electrically connected to the reflective electrode through the first via extending through the first insulating layer and the second insulating layer, and through the first aperture extending through the pixel electrode; and
- a region corresponding to the first via is within a region corresponding to the first aperture.

20. The method of claim 13, wherein the common electrode in the array substrate is formed to comprise a plurality of common sub-electrodes separated from each other;
- the method further comprises forming a plurality of touch control signal lines configured to transmit touch signals;
- a respective one of the plurality of touch control signal lines is formed to be electrically connected to a respective one of the plurality of common sub-electrodes; and
- the plurality of touch control signal lines and the reflective electrode are in a same layer using a same material in a same patterning process and using a single mask plate.

* * * * *